Sept. 13, 1932.  T. F. RAINSFORD  1,876,747
RIM ROLLING MACHINE
Filed Aug. 1, 1927  9 Sheets-Sheet 1

Inventor
Thomas F. Rainsford
By
Attorney's

Sept. 13, 1932. T. F. RAINSFORD 1,876,747
RIM ROLLING MACHINE
Filed Aug. 1, 1927 9 Sheets-Sheet 2

Inventor
Thomas F. Rainsford

Attorneys

Sept. 13, 1932. T. F. RAINSFORD 1,876,747
RIM ROLLING MACHINE
Filed Aug. 1, 1927 9 Sheets-Sheet 3

Thomas F. Rainsford, Inventor

Attorneys

Sept. 13, 1932.  T. F. RAINSFORD  1,876,747
RIM ROLLING MACHINE
Filed Aug. 1, 1927  9 Sheets-Sheet 7

Inventor
Thomas F. Rainsford

By

Attorneys

Sept. 13, 1932.  T. F. RAINSFORD  1,876,747
RIM ROLLING MACHINE
Filed Aug. 1, 1927  9 Sheets-Sheet 8

Thomas F. Rainsford, Inventor

Sept. 13, 1932. T. F. RAINSFORD 1,876,747
RIM ROLLING MACHINE
Filed Aug. 1, 1927 9 Sheets-Sheet 9

Inventor
Thomas F. Rainsford
By
Attorneys

Patented Sept. 13, 1932

1,876,747

UNITED STATES PATENT OFFICE

THOMAS F. RAINSFORD, OF DETROIT, MICHIGAN, ASSIGNOR TO WHITEHEAD AND KALES COMPANY, OF RIVER ROUGE, MICHIGAN, A CORPORATION OF MICHIGAN

RIM ROLLING MACHINE

Application filed August 1, 1927. Serial No. 209,840.

This invention relates to rim rolling machines and has as its objects to simplify, render more efficient and improve generally devices of this character.

The various objects, advantages and novel details of construction of the invention will be made more apparent as this description proceeds, especially when considered in connection with the accompanying drawings wherein:

Figure 11 is a sectional view through the rim blank before rolling.

Figure 12 is a similar sectional view after the rolling operation is completed.

Figure 1:
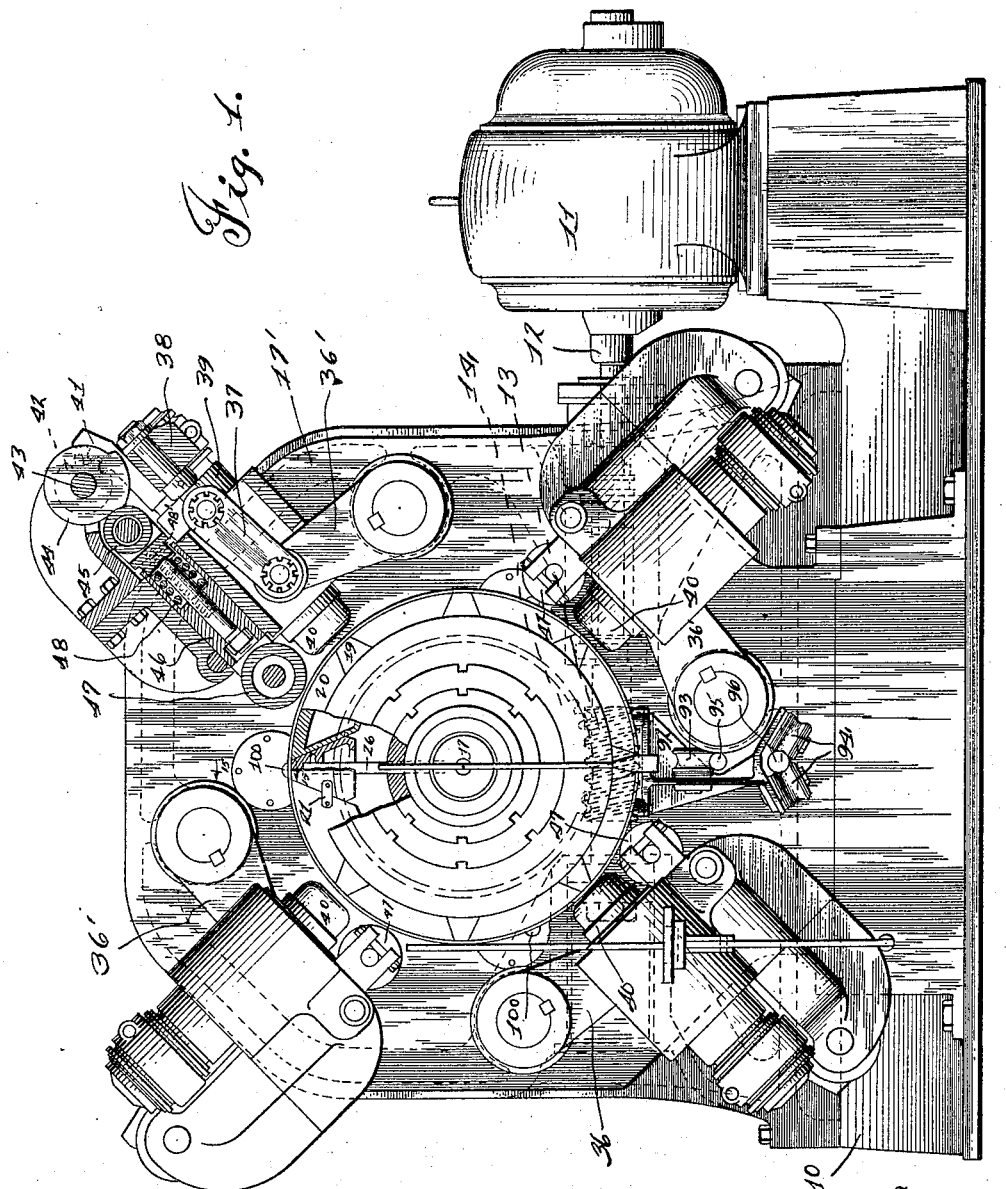
Figure 1 is a front elevation of the machine with certain parts thereof in section.

Referring now particularly to the drawings wherein like reference characters indicate like parts, it will be noted by particular reference to Figures 11 and 12 that the problem presented is that of rolling a blank B, which is in the form of a circular band, so as to form the rim R provided with inwardly turned flanges R'.

The machine for accomplishing this includes a base 10 upon which a main driving motor 11 is mounted. The drive shaft 12 of this motor carries a worm 13 which meshes with a worm gear 14 keyed to a sleeve 15. Sleeve 15 is journaled in bearings 16 carried by the main body 17' of the machine. Arranged within the sleeve 15 and movable longitudinally therethrough is a ram shaft 17.

Figure 4:
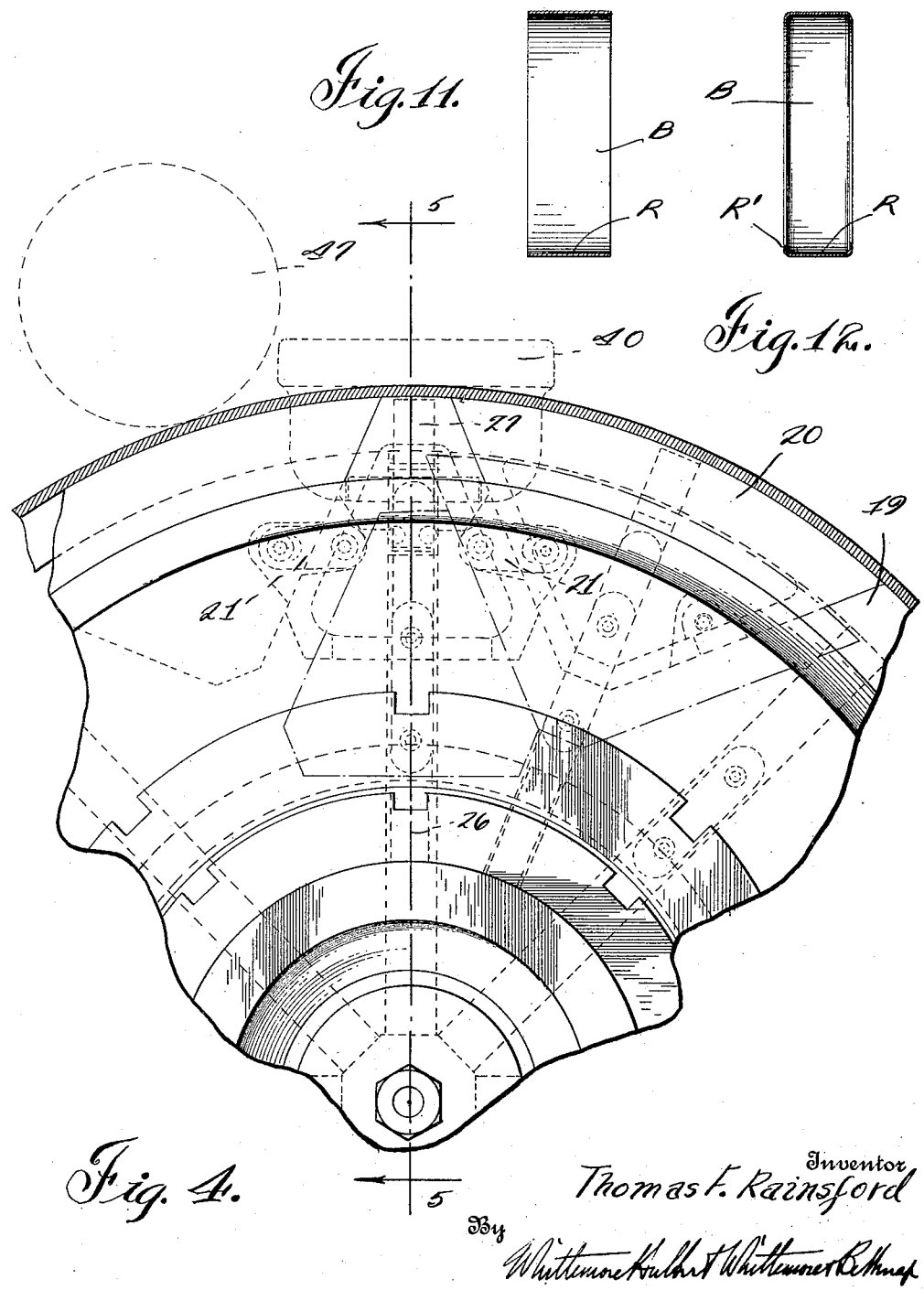
Figure 4 is an enlarged fragmentary sectional view through the rim holding chuck.
Figure 5:
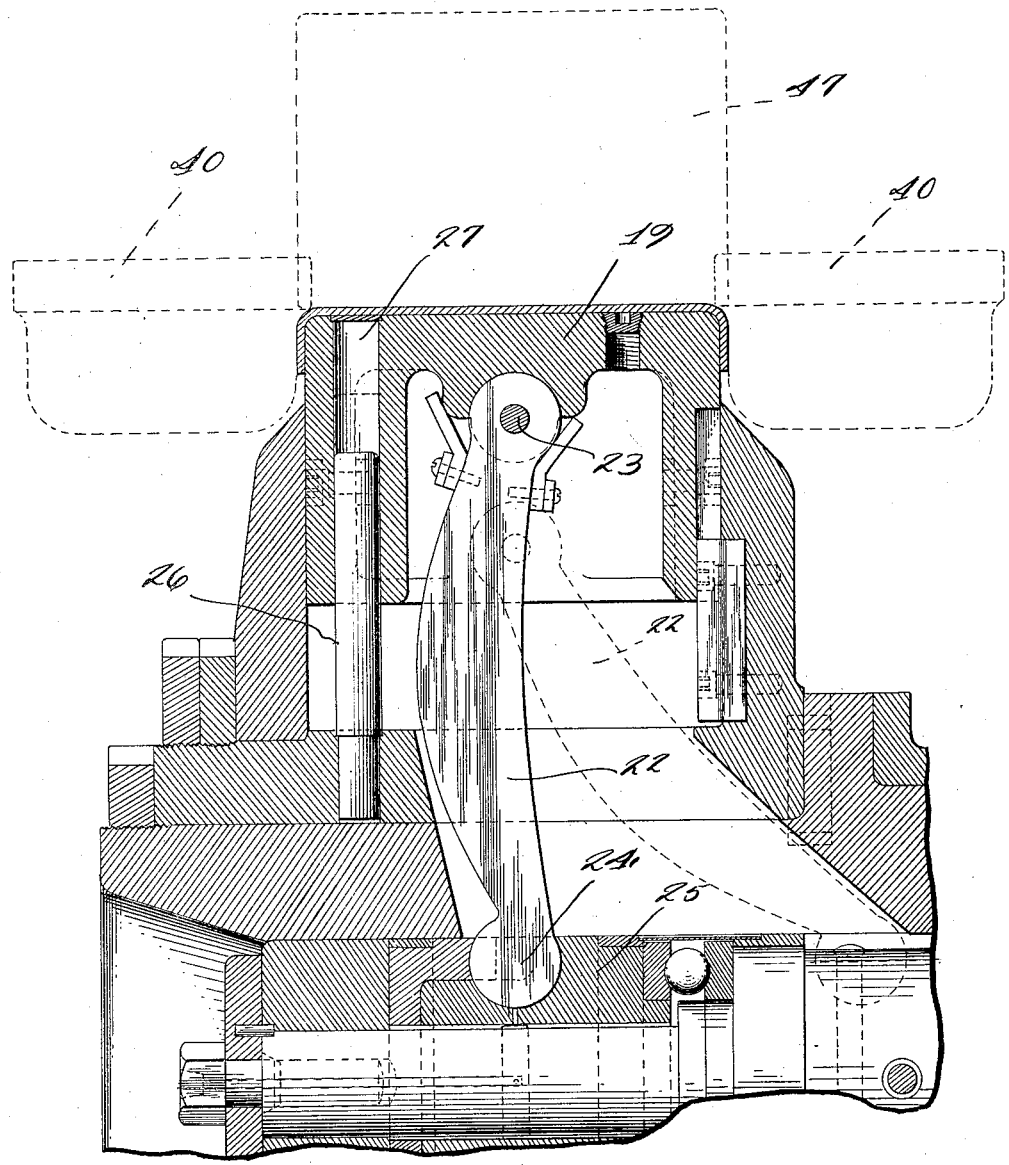
Figure 5 is a sectional view taken substantially on the plane indicated by line 5—5 in Figure 4.
Figure 6:
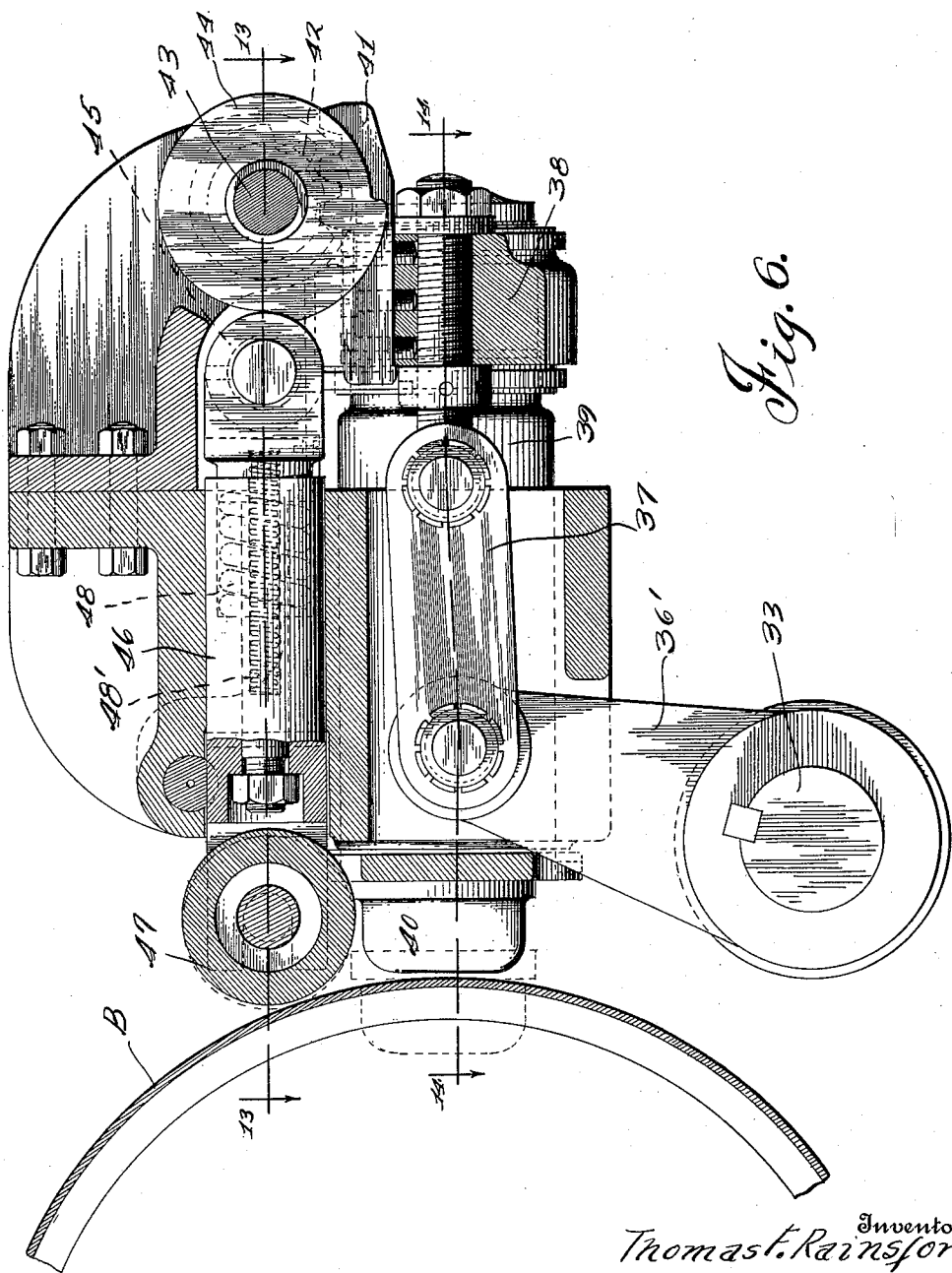
Figure 6 is an enlarged fragmentary sectional view of one of the roll mechanism units.
Figure 7:
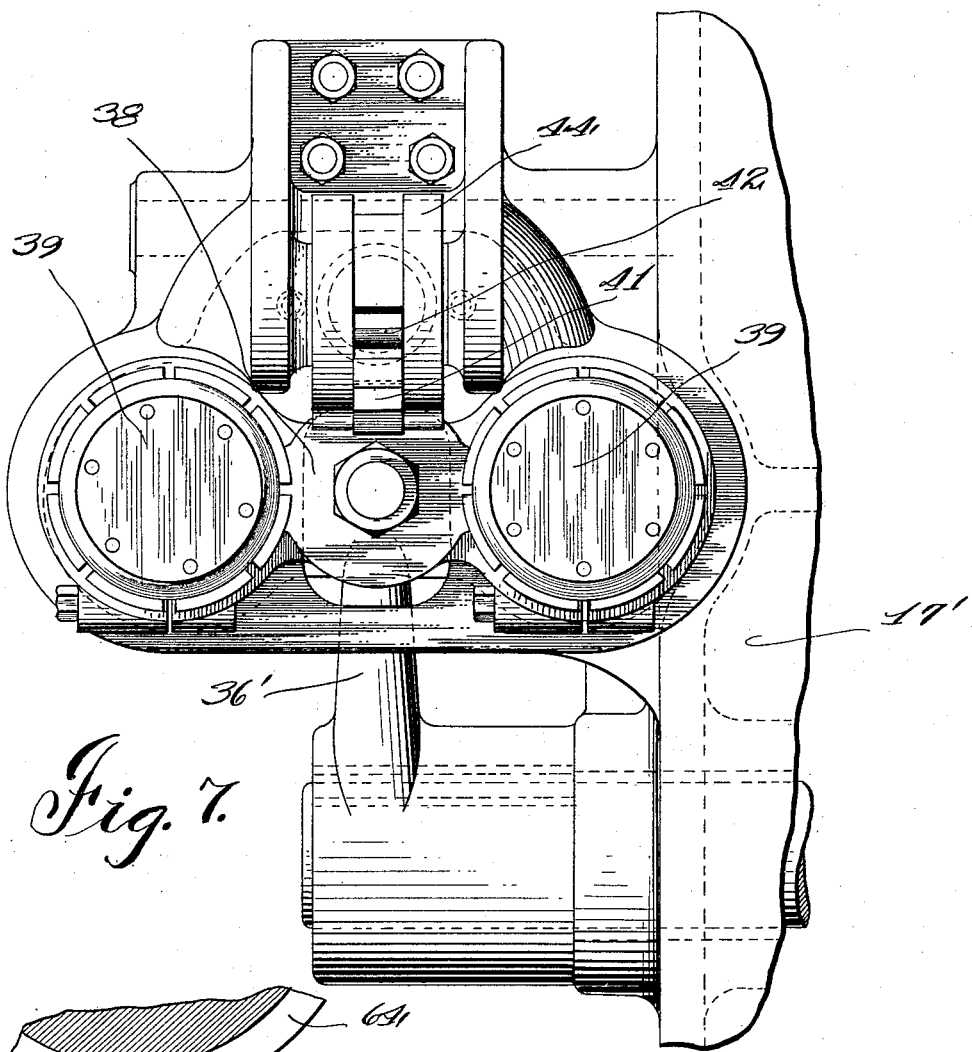
Figure 7 is an end elevational view of the structure illustrated in Figure 6.

Sleeve 15 is provided at one end thereof with an expansible chuck for receiving the blank B and as will be more apparent from an examination of Figures 4 and 5 this chuck consists of a pair of spaced plate-like frame members between which are arranged a plurality of driven wedge shaped members 19 alternating with a plurality of other wedge shaped members 20. These wedge shaped members are articulated or connected by means of links 21 so that upon movement of the driven wedge members 19 all of the wedge members may be moved radially outwardly to expand the chuck to stretch and hold the blank B. The driven wedge members 19 are operated by means of links 22 pivotally connected thereto as at 23 and pivotally connected as at 24 to a sleeve 25 carried on the end of shaft 17. Radially arranged guide pins 26 may be provided which slidably engage recesses 27 arranged in the several wedge members. As a consequence of the construction just described an axial movement of shaft 17 will move the links 22 from the dotted line position shown in Figure 5 to the full line position shown in that figure whereupon the several driven wedge members 19 will be moved radially outwardly and because of the wedging engagement with the other wedge members 20 and by reason of their articulated relation the other wedge members will be like-wise moved radially outwardly to uniformly expand the chuck and as a consequence stretch and firmly hold the blank B.

Figure 3:
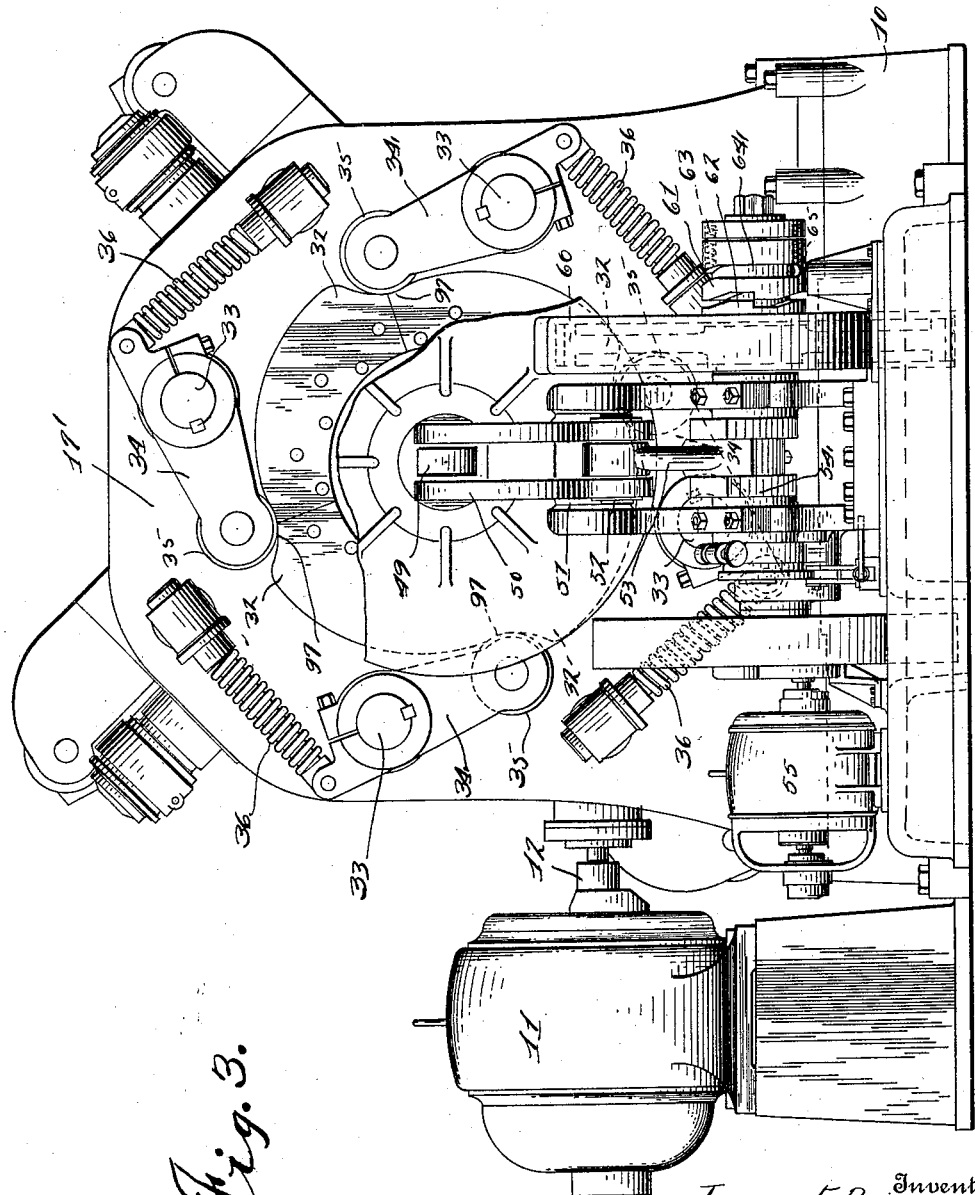
Figure 3 is a rear elevation of the machine.

Keyed to sleeve 15 as at 28 is a casing or housing 29 adapted to contain a planetary reduction gearing indicated generally by the reference character 30. This reduction gearing drives cam member 31 at a considerable reduced speed to that at which sleeve 15, and consequently the blank holding chuck, is driven. Cam member 31 is provided with a plurality, herein shown as four, of cams 32, see more particularly Figure 3. Rotatably journaled in the body 17' of the machine are four shafts 33 to each of which a lever 34 is keyed. Each lever carries at one end thereof a roller 35 adapted for engagement with the cams 32. Lever 34 is normally urged in a direction such as to cause roller 35 to engage its cam 32 by means of a spring 36. Obviously the levers 34 are rocked against the tension of springs 36 as the rollers 35 ride upon the cam surfaces 32.

Each shaft 33 extends to a point adjacent the front of the machine and carries a lever 36' keyed thereto. This lever is connected by link 37 to a crosshead 38 operating a pair of plungers 39 each of which carries a spinning or flange bending roll 40. The plungers 39 are eccentrically mounted in bushings 39' so that they may be adjusted by rotation to vary the position of roll 40 to compensate for wear, thickness of material, etc. Each crosshead is provided with a rack 41 which meshes with a pinion 42 on a shaft 43 which shaft also carries a pair of cams 44 adapted for engagement with a roller 45 carried on the end of a plunger 46. The other end of this plunger supports a clamping or pressing roll 47. The plunger 46 is formed in two parts with a coil spring 48 arranged therebetween so that after engagement of the roll 47 with the blank any further movement of the roller 45 may be absorbed by the spring 48. Springs 48' are also provided, acting on the outer section of plunger 46, to return the parts to normal position. As the shaft 33 is rocked by the engagement of a cam 32 with the roller 35, lever 36' is oscillated and through link 37 operates the crosshead 38 which moves the rollers 35 radially inwardly.

The initial movement of the crosshead 38 operates through rack 41 and pinion 42 to rotate cams 44 which brings the high portion of the cams into engagement with the roller 45 to thus immediately move roll 47 into engagement with the periphery of the blank B. Thus prior to the operation of the spinning rolls 40 the blank is engaged by the pressure rolls 47.

Shaft 17 is connected by means of a link 49 to a bell crank lever 50 pivotally mounted as at 51 to a fixed part of the base of the machine. The other end of the bell crank lever is pivotally connected as at 52 to a connecting rod 53 which in turn is connected to the crank portion of a crank shaft 54. The arrangement of the parts is such that one-half of a rotation of crank shaft 54 rocks bell crank lever 50 so as to move shaft 17 to its extreme right hand position as viewed in Figure 2 whereupon links 22 are moved to dotted line position shown in Figure 5 whereupon the chuck is contracted. A movement of the shaft 17 in the other direction expands the chuck as will be apparent.

Figure 10:
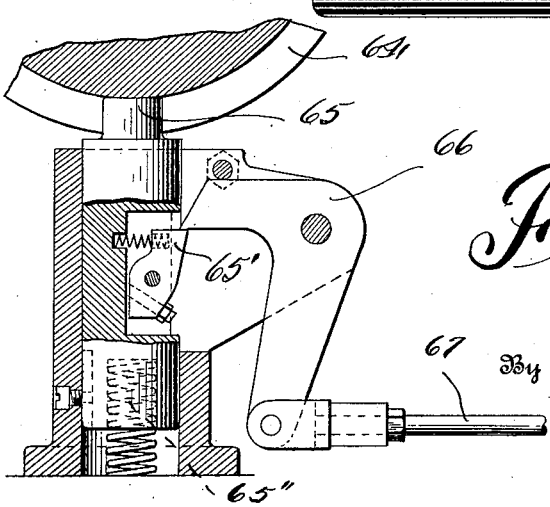
Figure 10 is an enlarged elevational view of the clutch control mechanism.
Figure 14:
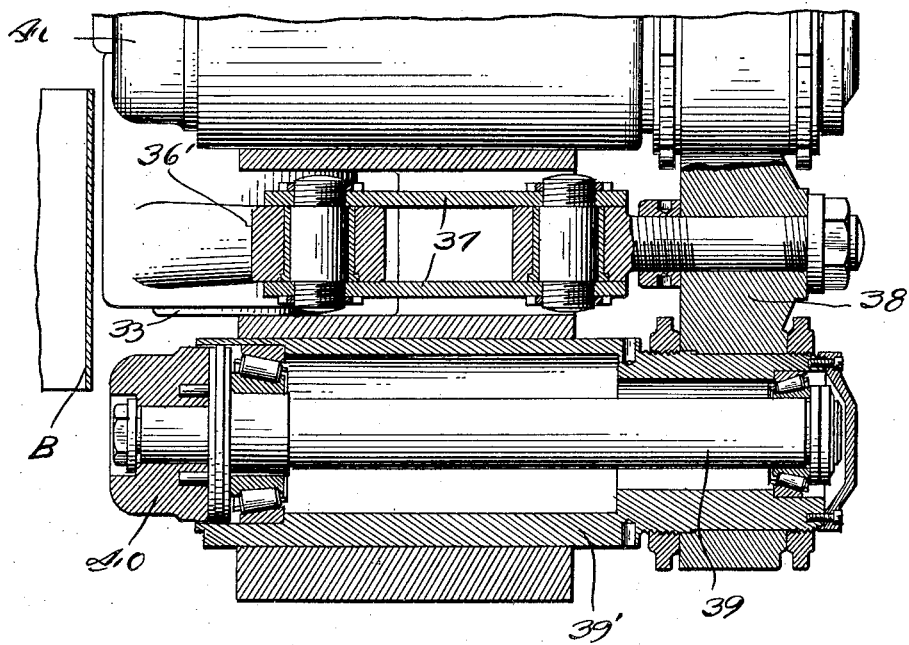
Figure 14 is a section through the spinner roll on line 14—14 of Figure 6.

Crank shaft 54 is driven by means of motor 55 through pinion 56 which meshes with gear 57 carried by shaft 58 which shaft carries on its other end a pinion 59 meshing with large gear 60 carried by crank shaft 54. Gear 60 is, however, loosely mounted upon crank shaft 54 and is adapted to be coupled thereto by means of a clutch 61 keyed to but slidable upon crank shaft 54. The movable member of clutch 61 is normally urged into clutching position into engagement with stationary member 62 of the clutch by means of spring 63. The clutch part 61 is formed with a pair of cam grooves 64 adapted to be engaged by a pin 65. Pin 65 is operated by means of lever 66 which lever is controlled by means of a rod 67 which extends to a point adjacent the front of the machine where it is pivotally connected as at 68 to a control lever 69. With the pin 65 in engagement with one of the cam slots 64 the clutch 61 will, after one-half a rotation, be disengaged from the clutch part 62 so that crank shaft 54 is stopped after every one-half revolution. The end of lever 66 operates pin 65 through a latch 65' pivoted in a recess in pin 65. When lever 66 is operated it retracts pin 65 from slot 64 and permits clutch part 61 to engage part 62. Lever 66 slips off latch 65' and pin 65 is again urged upwardly by its spring 65'' into position to again engage a cam groove 64. When lever 66 is permitted to return to normal position it moves past latch 65' and again assumes the position shown in Figure 10.

Figure 2:
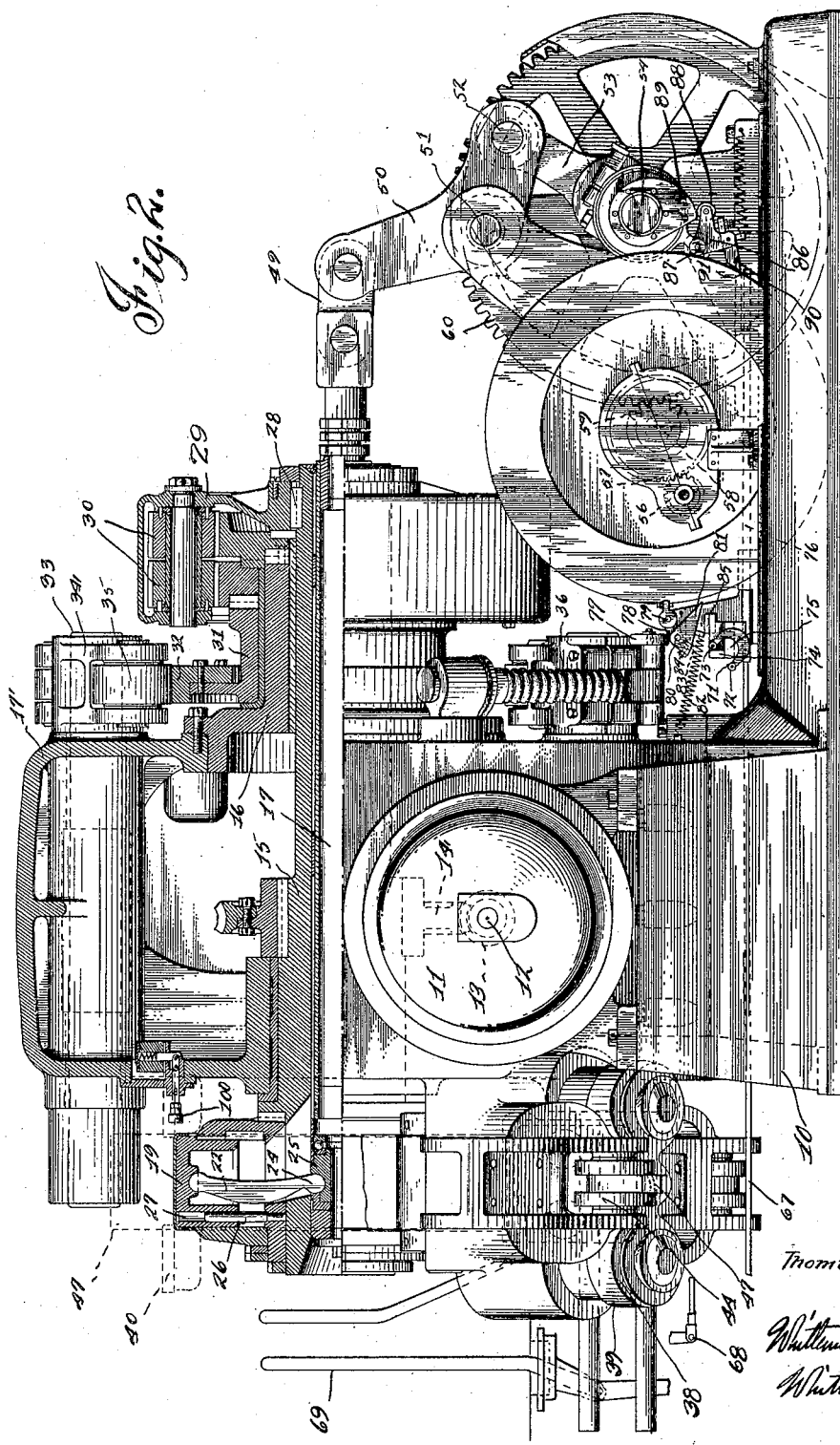
Figure 2 is a side elevation of the machine with certain parts thereof in section.
Figures 8, 9:
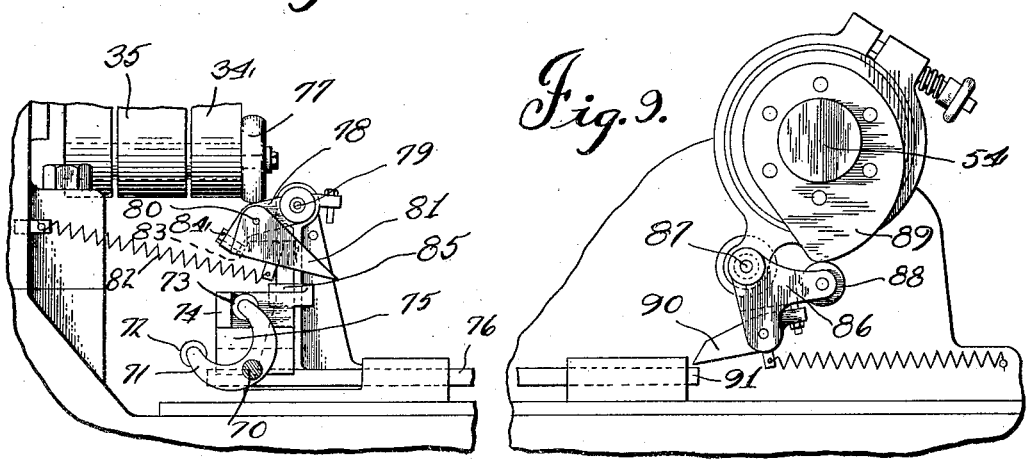
Figure 8 is an enlarged elevational view of a portion of the switch operating mechanism.
Figure 9 is an enlarged elevational view of another portion of the switch operating mechanism.
Figure 13:
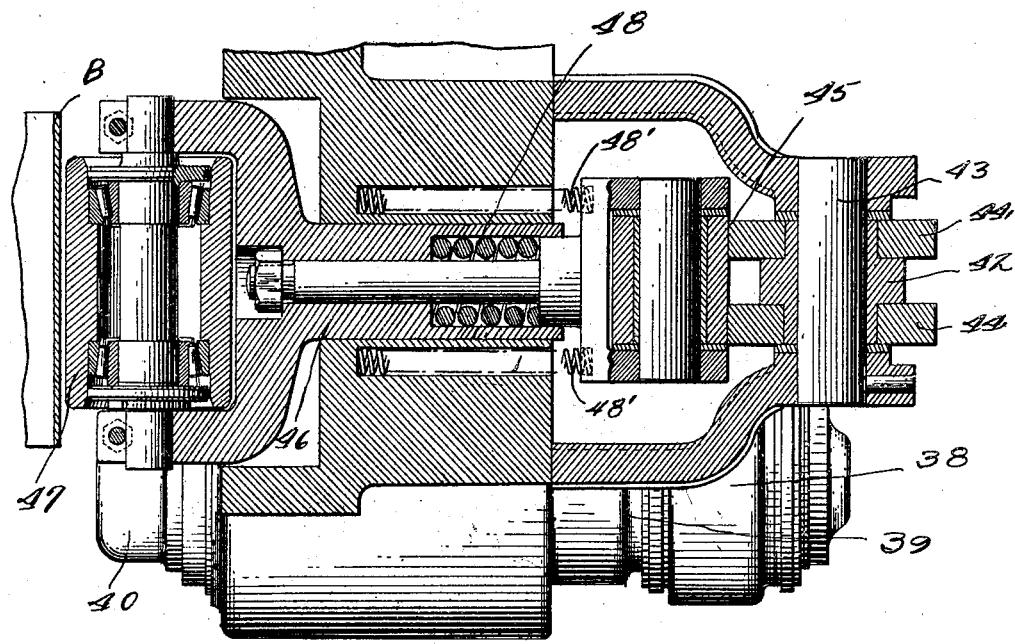
Figure 13 is a section through the pressure roll on line 13—13 of Figure 6.

In order to provide means for automatically starting and stopping the main motor 11, I provide a switch 70 adapted to be operated by a lever 71 carrying a pair of spaced rollers 72 and 73. These rollers are adapted to be alternately engaged by means of an abutment 74 carried upon a block 75 secured to the end of shaft 76. This shaft is mounted for longitudinal sliding movement in suitable brackets and is adapted to be moved in one direction by means operated by the crank shaft 54 and in the opposite direction by means controlled by one of the levers 34. This latter means consists of a cam 77 adapted to engage a lever 78 pivotally mounted as at 79. This lever has pivoted thereto as at 80 a dog 81 normally urged by spring 82 in a direction in which a shoulder 83 engages an adjustable pin 84. Thus the dog 81 is free to move in one direction but independent movement relative to the lever 78 is prevented in the other direction. The dog 81 is adapted to engage an abutment or shoulder 85 carried by the block 75. This portion of the mechanism operates as follows:

As the lever 34 is swung outwardly by engagement with the cam 32 the cam 77 is moved upwardly as viewed in Figures 2 and 8 away from lever 78. This permits spring 82 to swing lever 78 about its pivot 79 so as to bring the dog 81 behind the left hand end of shoulder 85. When, however, the cam roller 35 comes to the end of cam 32 and the lever 34 moves back, cam 77 is moved downwardly and rocks lever 78 about its pivot 79 in a counter-clockwise direction. This movement causes dog 81 to move block 75 toward the right as viewed in Figure 8 thus moving shaft 76 toward the right also. The movement of the block 75 brings shoulder 74 into engagement with roller 73 of the switch operating arm and snaps this switch into its off position.

For operating the switch to close the same, I provide a bell crank lever 86 pivoted as at 87 and carrying at one end thereof a roller 88 adapted to be engaged by cam 89 carried by crank shaft 54. The other arm of the bell crank carries a dog 90 which is adapted for engagement with the end 91 of shaft 76. Bell crank lever 86 is normally held in the position illustrated in Figure 9 by suitable spring. As a consequence when clutch 61 has been operated to cause one-half a revolution of crank shaft 54 cam 89 will rock bell crank lever 86 and cause dog 90 to shift shaft 76 to the left as viewed in Figures 2, 8 and 9 whereupon abutment 74 will engage roller 72 and move switch operating arm to the left thus closing the switch and energizing the circuit including motor 11. Ths occurs just after shaft 17 has been moved to the left to expand the expansible chuck which grips the work blank.

Figure 15:
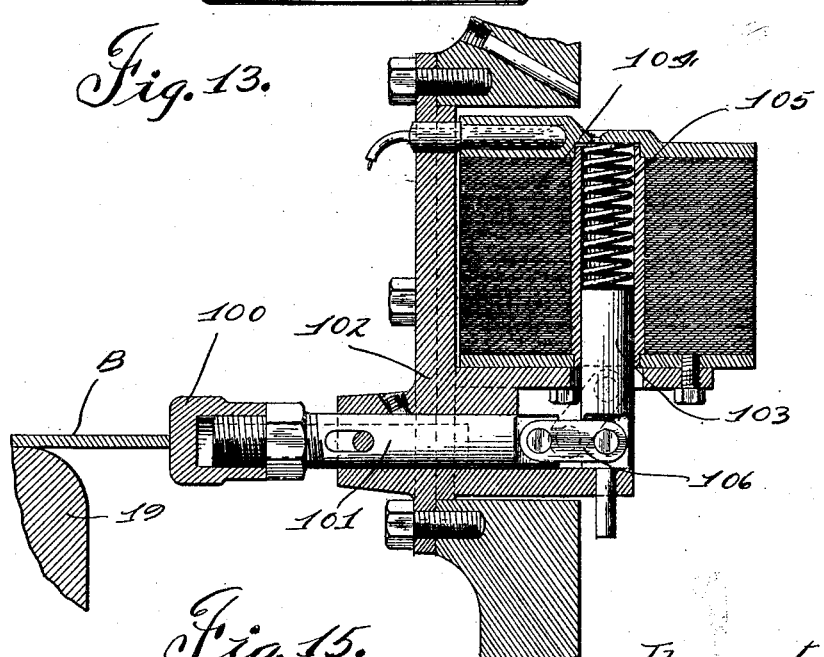
Figure 15 is a section through the rim locating mechanism on line 15—15 of Figure 1.

The blank B may be introduced to the chuck by means of a work carrier 92 supported by rolls 93 and 94 running on tracks 95 and 96 respectively. The engagement of the work blank B with the chuck is facilitated inasmuch as the chuck is at that time in its contracted position. For positioning the blank B there is preferably provided a plurality of stops 100 illustrated in detail in Figure 15 and arranged circumferentially as shown in Figure 1. These stops engage the edge of the blank to align and position the same and each stop is carried by a plunger 101 slidably mounted in a housing 102 and controlled by the movable core 103 of a solenoid 104. A spring 105 normally urges the core 103 downwardly so as to hold plunger 101 rigidly projected by reason of the link 106. When, however solenoid 104 is energized plunger 101 is drawn inwardly to move stop 100 away from the blank. Solenoid 104 may be energized each time the bending rolls start to operate and de-energized at the end of each operation by any suitable mechanism. When, however, the work piece is arranged concentric with the chuck, lever 69 is operated to withdraw pin 65 from either of the cam slots 64 whereupon the movable clutch part 61 will engage clutch part 62 to couple gear 60 with crank shaft 54. The control lever 69 when released immediately permits pin 65 to engage the idle end of cam slot 64 so that after a one-half rotation of the crank shaft the cam part 61 is again moved to disengaged position. The one-half rotation of the crank shaft has, however, been sufficient to move shaft 17 toward the left to move outwardly the segments of the expansible chuck. This rotation of crank shaft 54 has caused cam 89 to operate switch 70 closing the circuit to the motor 11 whereupon the chuck is rotated as well as the cam member 31. The pitch of the cams 32 is such as to slowly move the arm 34 outwardly which in turn rotates shafts 33 and through links 36' moves crossheads 38. Crossheads 38 first move pressure rolls 47 into engagement with the outer surface of the blank B to hold the same firmly upon the chuck, this movement occurring prior to the engagement of the spinning or flange bending rolls 40. It will be understood that four pressure rolls 47 are provided spaced circumferentially of the chuck. In the embodiment of the invention herein illustrated eight of the spinning rolls 40 are provided so that both flanges R' are bent simultaneously. After the pressure rolls 47 have engaged the blank the continued movement of the crosshead 38 causes the spinning rolls 40 to move radially inwardly and owing to the rotation of the chuck which carries the blank the flanges R' are bent or rolled so as to extend radially inwardly as illustrated in Figure 12.

When the cam 31 has completed a one-quarter revolution the rollers 35 fall into dwells 97 under the influence of spring 36 thus withdrawing pressure rolls 47 and spinning rolls 40. At the same time cam roller 77 engages lever 78 and operates block 75 to open switch 70 thus cutting off the power to motor 11 which in turn stops rotation of the chuck and of the cam. Control lever 69 is then again operated to withdraw pin 65 from one of the cam slots 64 whereupon crank shaft 54 completes another one-half revolution which moves shaft 17 to the right drawing the chuck radially inwardly to permit the removal of the rolled rim R.

While the invention has been described herein somewhat in detail, it will be readily apparent to those skilled in this art that various changes in many of the essential and all of the non-essential details of the construction may be resorted to without departing from the spirit and scope of this invention and to this end reservation is made to make such changes as may come within the purview of the accompanying claims.

What I claim as my invention is:

1. In a rim rolling machine, means for supporting and rotating a cylindrical blank, pressure and spinning rolls, means for causing said rolls to engage said blank and means operated by said last means for stopping the rotation of said blank upon completion of the rolling operation.

2. In a rim rolling machine, means for supporting and rotating a cylindrical blank, a pressure roll engaging the outer periphery of said blank, a spinning roll engaging the edge of said blank and means for actuating differentially said rolls whereby said pressure roll engages the blank prior to said spinning roll.

3. In a rim rolling machine, means for supporting and rotating a cylindrical blank, a radially movable pressure roll engaging the outer periphery of said blank, a radially movable spinning roll engaging the edge of said blank and means for differentially actuating said rolls whereby said pressure roll engages the blank prior to said spinning roll.

4. In a rim rolling machine, means for supporting and rotating a blank, a pressure roll, a spinning roll, means for causing said spinning roll to engage the edge of said blank and means actuated upon the initial movement of said last named means for causing said pressure roll to move relative to said spinning roll to engage said blank.

5. In a rim rolling machine, a chuck for supporting and rotating a cylindrical blank, said chuck including a plurality of wedge shaped segments, links pivotally connecting said segments, and means for positively moving alternate segments for expanding said chuck to engage said blank, said links serving to transmit the movement of said alternate segments to the remaining segment.

6. In a rim rolling machine, means for supporting and rotating a blank, pressure and spinning rolls engageable with said blank and means for actuating said rolls, said means including a cam, levers actuated by said cam, and crossheads movable with said levers.

7. In a rim rolling machine, means for supporting and rotating a blank, pressure and spinning rolls engageable with said blank and cam controlled means for differentially actuating said rolls whereby said pressure roll engages said blank prior to said spinning roll.

8. In a rim rolling machine, means for supporting and rotating a cylindrical blank, a pressure roll engageable with the periphery of said blank, a pair of spinning rolls engageable with the ends of said blank, means for moving said spinning roll to engage said blank and means operated upon movement of said last named means for actuating said pressure roll.

9. In a rim rolling machine, means for supporting and rotating a tubular blank, a pressure roll engageable with the outer surface of said blank, a pair of spinning rolls engageable with the ends of said blank, a crosshead connecting said spinning rolls and means for moving said crosshead to actuate said spinning rolls.

10. In a rim rolling machine, means for supporting and rotating a tubular blank, a pressure roll engageable with the outer surface of said blank, a pair of spinning rolls engageable with the ends of said blank, a crosshead connecting said spinning rolls, means for moving said crosshead to actuate said spinning rolls and means actuated upon movement of said crosshead for actuating said pressure roll.

11. In a rim rolling machine, means for supporting and rotating a tubular blank, a pressure roll engaging the outer surface of said blank, a pair of spinning rolls engageable with the ends of said blank, a crosshead connecting said spinning rolls, means including a cam operated upon movement of said crosshead for actuating said pressure roll and means for moving said crosshead.

12. In a rim rolling machine, means for supporting and rotating a tubular blank, a pressure roll engaging the outer surface of said blank, a pair of spinning rolls engageable with the ends of said blank, a crosshead connecting said spinning rolls, a cam for operating said pressure roll, a rack and pinion connection between said cam and crosshead for actuating said cam upon a movement of said crosshead and means for actuating said crosshead whereby said spinning and pressure rolls are actuated.

13. In a rim rolling machine, means for supporting and rotating a cylindrical blank, a pressure roll engageable with the periphery of said blank, spinning rolls engageable with the edge of said blank, means for positively operating said spinning rolls and means for operating said pressure roll upon movement of said spinning rolls, said last means including a plunger comprising two parts and a spring interposed therebetween, as and for the purpose set forth.

14. In a rim rolling machine, an expansible chuck for supporting a blank, pressure and spinning rolls engageable with said blank, means for actuating said rolls, means for rotating said chuck, a driving means for said last two named means and a control for said driving means operated by said roll actuating means at the completion of the rolling operation.

15. In a rim rolling machine, a chuck for supporting a blank, means for expanding and contracting said chuck, pressure and spinning rolls engageable with said blank, means for operating said rolls, means for rotating said chuck, a motor for actuating said last two named means, means actuated by said chuck expanding means for starting said motor and means controlled by said roll actuating means for stopping said motor upon the completion of the rolling operation.

16. In a rim rolling machine, a chuck for supporting a blank, means for expanding and contracting said chuck, including a longitudinally movable shaft, a driving motor, a clutch between said motor and shaft and cam means for automatically disengaging said clutch at the end of the movement of said shaft in either direction.

17. In a rim rolling machine, a chuck for supporting a cylindrical blank, a plurality of pressure rolls engageable with the outer surface of said blank for holding the same in engagement with said chuck, a plurality of pairs of spinning rolls engageable with the edge of said blank, means for actuating said pressure rolls upon the initial movement of said spinning rolls, a rotatable cam disc provided with a plurality of cam portions, means actuated by said cam portions for controlling said spinning rolls, a driving motor for rotating said chuck and means including a reduction gearing for rotating said cam upon a rotation of said chuck.

18. In a rim rolling machine, an expansible chuck for supporting a cylindrical blank, pressure and spinning rolls engageable with said blank, means for actuating said rolls and for rotating said chuck, said means including a driving motor, means for expanding and contracting said chuck, automatic means operable upon the expansion of said chuck for starting said driving motor and automatic means operable by said roll operating means, upon the completion of said rolling operation, for stopping said driving motor.

19. In a rim rolling machine, a chuck for supporting a blank, means for expanding and contracting said chuck, means for rotating said chuck, and means operable by said first mentioned means for starting the operation of said rotating means.

20. In a rim rolling machine, a chuck for supporting a blank, means including a longitudinally movable shaft for expanding and contracting said chuck, a motor for rotating said chuck and means actuated by the movement of said shaft for starting the operation of said motor.

21. In a rim rolling machine, a chuck for supporting a blank, means for rotating said chuck, a forming roll, means for moving said forming roll toward and away from said blank, and means operable by the movement of said forming roll moving means for stopping the rotation of said chuck.

22. In a rim rolling machine, a chuck for supporting a blank, a shaft for expanding and contracting said chuck, a forming roll, a lever for moving said forming roll toward and away from said blank, means for rotating said chuck, means for starting the actuation of said rotating means upon movement of said shaft, and means for stopping the actuation of said rotating means in dependence upon the movement of said lever.

23. In a rim rolling machine, means for supporting and rotating a tubular blank, a pressure roll, a spinning roll, means for moving said spinning roll, and means operable upon movement of said spinning roll to move said pressure roll relative to said spinning roll to cause the pressure roll to engage the blank in advance of the spinning roll.

In testimony whereof I affix my signature.
THOS. F. RAINSFORD.